United States Patent
Yang

(10) Patent No.: US 7,800,923 B2
(45) Date of Patent: Sep. 21, 2010

(54) OFFLINE SYNCHRONOUS SWITCHING REGULATOR

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 413 days.

(21) Appl. No.: 12/039,754

(22) Filed: Feb. 29, 2008

(65) Prior Publication Data
US 2009/0219003 A1 Sep. 3, 2009

(51) Int. Cl.
*H02M 3/335* (2006.01)
*H02M 7/217* (2006.01)

(52) U.S. Cl. .................. 363/21.06; 363/21.14; 363/127

(58) Field of Classification Search .................. 363/17, 363/21.01, 21.06, 21.14, 81, 127
See application file for complete search history.

(56) References Cited

U.S. PATENT DOCUMENTS

| | | | |
|---|---|---|---|
| 5,774,350 A * | 6/1998 | Notaro et al. ................. | 363/89 |
| 6,501,666 B1 | 12/2002 | Yang | |
| 6,535,400 B2 * | 3/2003 | Bridge ..................... | 363/21.06 |
| 6,788,554 B2 * | 9/2004 | Havanur .................. | 363/21.06 |
| 7,173,835 B1 * | 2/2007 | Yang .......................... | 363/89 |

FOREIGN PATENT DOCUMENTS

| | | |
|---|---|---|
| CN | 101005242 | 7/2007 |
| CN | 101106333 | 1/2008 |

* cited by examiner

*Primary Examiner*—Gary L Laxton
(74) *Attorney, Agent, or Firm*—Jianq Chyun IP Office

(57) ABSTRACT

An offline synchronous switching regulator is proposed for improving the efficiency thereof. Switches are coupled to switch a transformer and generate a switching signal at a secondary side of the transformer. A switching circuit is coupled to an output of the regulator to generate pulse signals in response to the switching signal and a feedback signal. Pulse signals are utilized to control a synchronous switch for rectifying and regulating the regulator. The synchronous switch includes a power-switch set and a control circuit. The control circuit receives pulse signals for turning on/off the power-switch set. The power-switch set is connected in between the transformer and the output of the regulator. A flyback switch freewheels an inductor current and can be turned on in response to the off state of the power-switch set whose on-time is correlated to the on-time of the power-switch set.

15 Claims, 7 Drawing Sheets

OFFLINE SYNCHRONOUS SWITCHING REGULATOR

BACKGROUND OF THE INVENTION

1. Field of the Invention

The present invention relates to power regulator, and more particularly, to an offline switching power regulator.

2. Description of Related Art

An offline power supply includes a power transformer to provide isolation from AC line input to the output of the power supply for safety. Various topologies are used for regulating the output of the power supply. Among them, the magnetic amplifier is a high efficiency solution. The circuit operation of magnetic amplifier is shown in a prior art of "Method and apparatus for magnetic amplifier to reduce minimum load requirement" by Yang, U.S. Pat. No. 6,501,666. However, the magnetic amplifier causes power loss of the diode and the saturable inductor. In recent development, the synchronous rectifier is developed to reduce the power loss of the diode, such as "Control circuit associated with saturable inductor operated as synchronous rectifier forward power converter" by Yang, U.S. Pat. No. 7,173,835. However, it requires additional devices such as saturable inductors and current-sense resistor that cause additional power consumptions.

SUMMARY OF THE INVENTION

The present invention develops a synchronous rectifying circuit to integrate with the regulation circuit for achieving higher efficiency. No magnetic amplifier is needed. No additional switching stage is required. The synchronous regulation circuit will achieve high efficiency power conversion from no load to full load.

The present invention proposes a synchronous switching regulator for improving the efficiency thereof. The synchronous switching regulator includes switches to switch a transformer and generate a switching signal at the secondary winding of the transformer. A switching circuit is coupled to the transformer and the output of the regulator to generate pulse signals in response to the switching signal and a feedback signal. The feedback signal is correlated to the output of the regulator. Pulse signals are generated for rectifying and regulating the synchronous switching regulator. The synchronous switch includes a power-switch set and a control circuit. The power-switch set is connected in between the secondary winding of the transformer and the output of the regulator. The control circuit is operated to receive pulse signals for turning on/off the power-switch set. Pulse signals are coupled from the switching circuit to the control circuit. The polarity of the pulse signals determines the on/off states of the power-switch set. A flyback switch is connected to the power-switch set and the output of the synchronous switching regulator. The flyback switch is turned on in response to the off state of the power-switch set. The on-time of the flyback switch is correlated to the on-time of the power-switch set.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1:
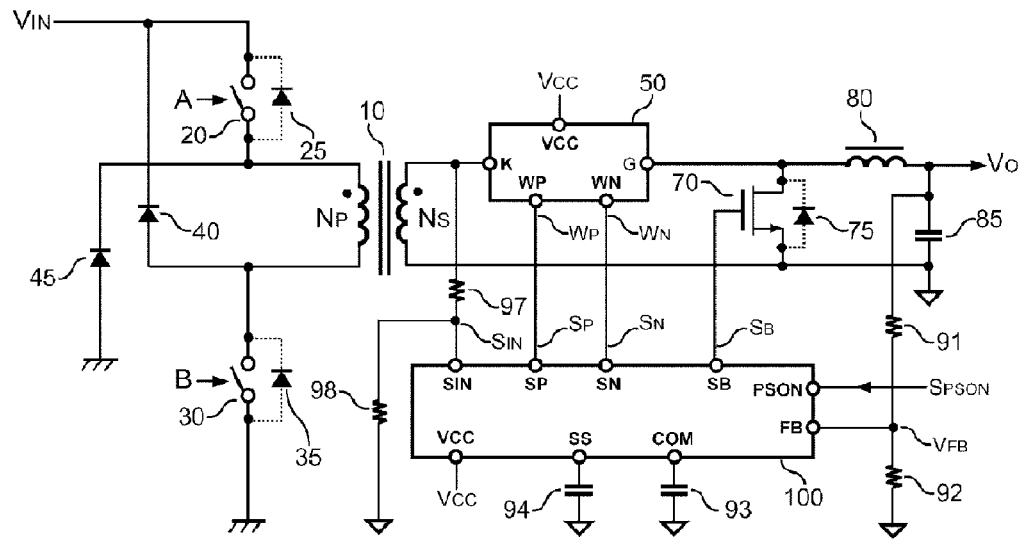
FIG. 1 shows an embodiment of an offline synchronous switching regulator according to the present invention.

FIG. 1 shows an embodiment of an offline synchronous switching regulator according to the present invention. It includes a transformer 10 having a primary side and a secondary side. At the primary side, two switches 20 and 30 are connected to a primary winding $N_P$ of the transformer 10 for switching the transformer 10. Primary switching signals A and B are coupled to control the transistor 20 and 30 respectively. A secondary switching signal is thus generated at a secondary winding $N_S$ of the transformer 10 in response to the switching of the transformer 10. A synchronous switch 50 has a terminal K connected to the secondary winding $N_S$. A terminal G of the synchronous switch 50 is coupled to the output of the regulator. The synchronous switch 50 mainly includes a power-switch set and a control circuit. The power-switch set is coupled in between the terminal K and the terminal G. The control circuit operates to receive pulse signals $S_P/S_N$ for turning on or off the power switch-set.

The synchronous switch 50 is coupled to a switching circuit 100 to respectively receive pulse signals $S_P$ and $S_N$ at terminals $W_P$ and $W_N$. A voltage divider formed by resistors 97 and 98 is connected to the secondary winding $N_S$ of the transformer 10 to obtain a switching signal $S_{IN}$ by attenuating the secondary switching signal. The switching signal $S_{IN}$ is coupled to the switching circuit 100. The switching circuit 100 thus generates pulse signals $S_P$ and $S_N$ in response to the switching signal $S_{IN}$ and a feedback signal $V_{FB}$. The feedback signal $V_{FB}$ is coupled to the output of the regulator via another voltage divider formed by resistors 91 and 92. Thus, the feedback signal $V_{FB}$ is correlated to an output voltage $V_O$ of the regulator. Pulse signals $S_P$ and $S_N$ are generated for rectifying and regulating the regulator. The polarity of pulse signals $S_P$ and $S_N$ determines the on or off states of the power-switch set.

An inductor 80 is coupled from the secondary winding $N_S$ to the output of the regulator. A flyback switch 70 is coupled to the secondary winding $N_S$ via the synchronous switch 50. The flyback switch 70 is further connected to the output of the regulator to freewheel the switching current of the inductor 80. The switching circuit 100 generates a driving signal $S_B$ to control the flyback switch 70. The flyback switch 70 is turned on in response to the off state of the power-switch set. The on time of flyback switch 70 is correlated to the switching signal $S_{IN}$ and the on time of the power-switch set. Furthermore, a capacitor 93 is connected to the switching circuit 100 for the loop compensation purpose. A capacitor 94 is used for the soft-start purpose. A power-on signal $S_{PSON}$ in connected to the switching circuit 100 to enable or disable the pulse signals $S_P$ or $S_N$.

Figure 2:
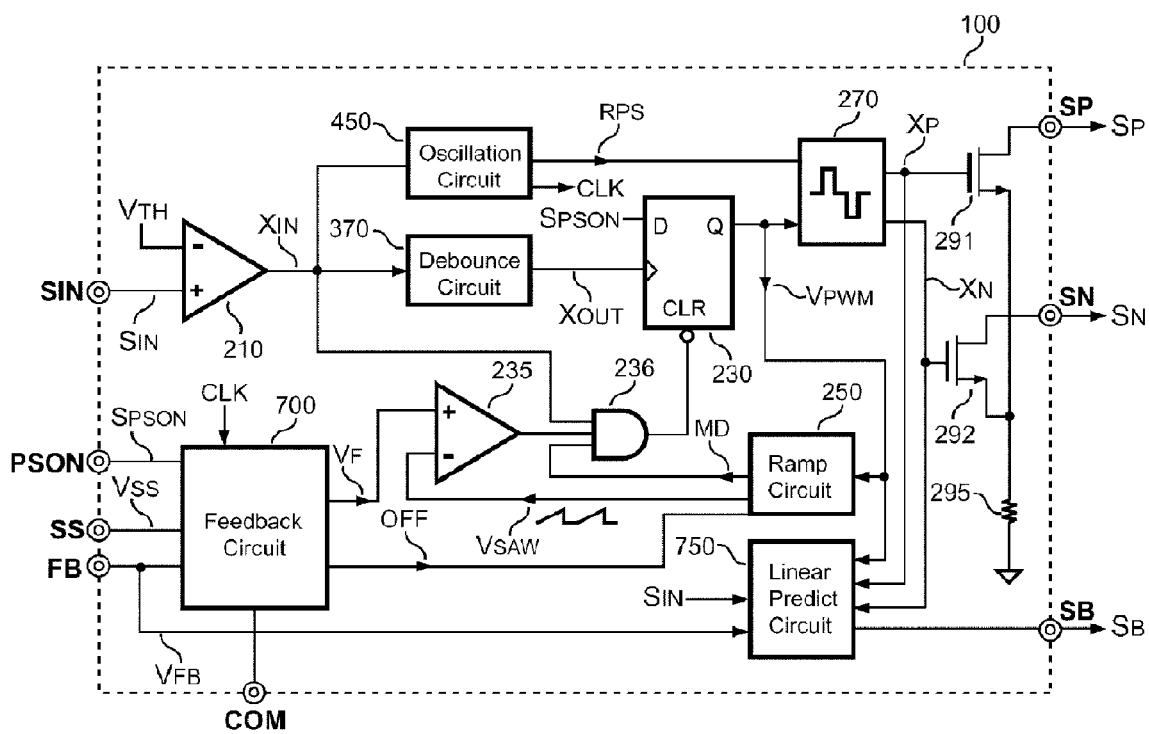
FIG. 2 shows an embodiment of a switching circuit according to the present invention.
Figure 7:
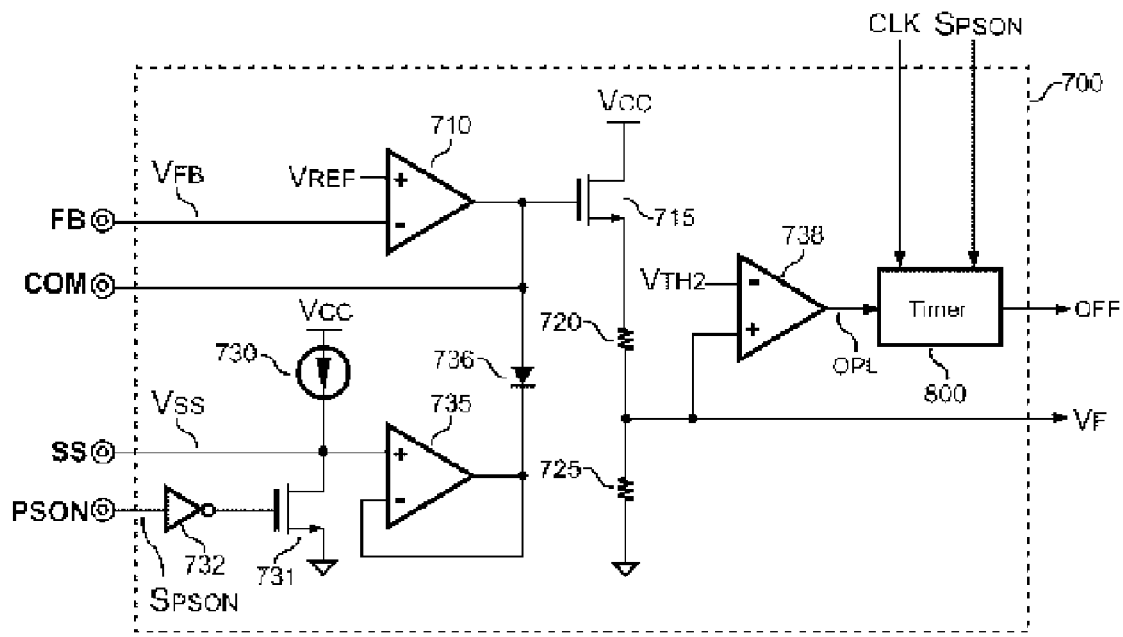
FIG. 7 shows an embodiment of a feedback circuit according to the present invention.

FIG. 2 shows an embodiment the switching circuit 100 according to the present invention. An oscillation circuit 450 generates an oscillation signal RPS. A D-flip-flop 230, an AND gate 236 and a comparator 235 develop a PWM circuit for generating a PWM signal $V_{PWM}$ at the output of the D-flip-flop 230 in response to the switching signal $S_{IN}$. The switching signal $S_{IN}$ is coupled to a comparator 210 to generate an input signal $X_{IN}$ when the switching signal $S_{IN}$ is higher than a threshold signal $V_{TH}$. The input signal $X_{IN}$ is coupled to the D-flip-flop 230 via a debounce circuit 370. The debounce circuit 370 generates an output signal $X_{OUT}$ in response to the input signal $X_{IN}$ to enable the PWM signal $V_{PWM}$. A clear-input of the D-flip-flop 230 is controlled by an output of the AND gate 236. An input of the AND gate 236 is coupled to the comparator 235. Referring to FIG. 2 and FIG. 7, a feedback circuit 700 includes an error amplifier, a soft-start circuit and a protection circuit. The feedback circuit 700 generates an off signal OFF when the feedback of the regulator is in open loop condition. The off signal OFF is coupled to disable the PWM signal $V_{PWM}$ and turn off the power-switch set of the synchronous switch 50. The error amplifier and the soft-start circuit of the feedback circuit 700 generate an error signal $V_F$ in response to the feedback signal $V_{FB}$ and a soft-start signal $V_{SS}$. A ramp circuit 250 is used to produce a ramp signal $V_{SAW}$ and a maximum-duty signal MD in response to the PWM signal $V_{PWM}$. The error signal $V_F$ and the ramp signal $V_{SAW}$ are connected to the comparator 235. The output of the comparator 235, the input signal $X_{IN}$ and the maximum-duty signal MD are coupled to the AND gate 236 to generate a clear signal for disabling the PWM signal $V_{PWM}$.

A pulse-signal generator 270 is employed for generating pulse signals $X_P$ and $X_N$ in response to the PWM signal $V_{PWM}$ and the oscillation signal RPS. Therefore, the PWM signal $V_{PWM}$ is enabled in response to the switching signal $S_{IN}$. The PWM signal $V_{PWM}$ is disabled in response to the oscillation signal RPS and the clear signal. The soft-start signal $V_{SS}$ is coupled to control the pulse width of the PWM signal $V_{PWM}$. Pulse signals $X_P$ and $X_N$ are differential signals. The polarity of pulse signals $X_P$ and $X_N$ is determined by the PWM signal $V_{PWM}$. The pulse signals $X_P$ and $X_N$ are further coupled to generate the pulse signal $S_P$ and $S_N$ via transistors 291 and 292, respectively. The resistor 295 connected to transistors 291 and 292 is applied to limit the current of transistors 291 and 292. Pulse signals $S_P$ and $S_N$ are differential signals. The polarity of pulse signals $S_P$ and $S_N$ (active low) is opposite to the polarity of the pulse signal $X_P$ and $X_N$ (active high). In addition, a linear-predict circuit 750 is employed for generating the driving signal $S_B$. The driving signal $S_B$ is coupled to control the flyback switch 70 in response to the switching signal $S_{IN}$, the PWM signal $V_{PWM}$ and pulse signals $S_P$ and $S_N$.

Figure 3:
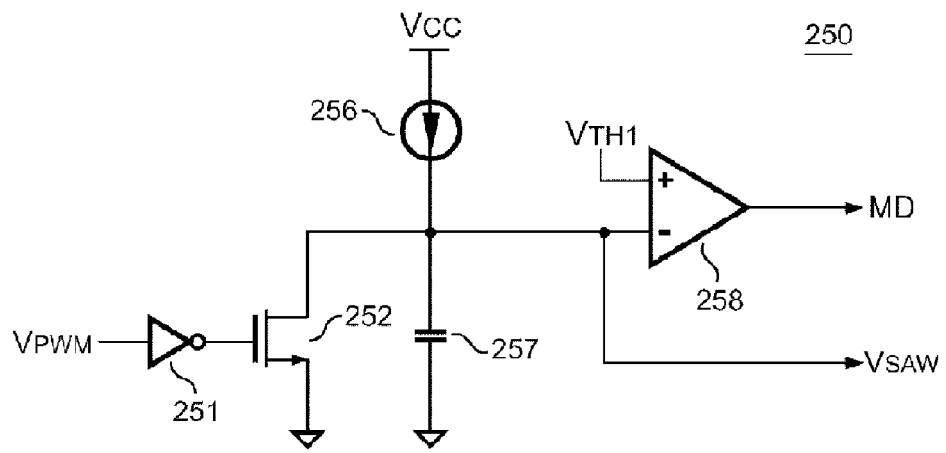
FIG. 3 shows an embodiment of a ramp circuit according to the present invention.

FIG. 3 shows an embodiment of a ramp circuit 250 according to the present invention. A current source 256 is utilized to charge a capacitor 257 when the PWM signal $V_{PWM}$ is enabled. The PWM signal $V_{PWM}$ is coupled to discharge the capacitor 257 via an inverter 251 and a transistor 252 when the PWM signal $V_{PWM}$ is disabled. The ramp signal $V_{SAW}$ is thus generated across the capacitor 257. A threshold voltage $V_{TH1}$ is supplied to an input of a comparator 258. Another input of the comparator 258 is supplied with the ramp signal $V_{SAW}$. An output of the comparator 258 generates the maximum-duty signal MD to disable the PWM signal $V_{PWM}$ once the ramp signal $V_{SAW}$ is higher than the threshold voltage $V_{TH1}$. Therefore, the maximum on-time of the PWM signal $V_{PWM}$ is limited.

Figure 4:
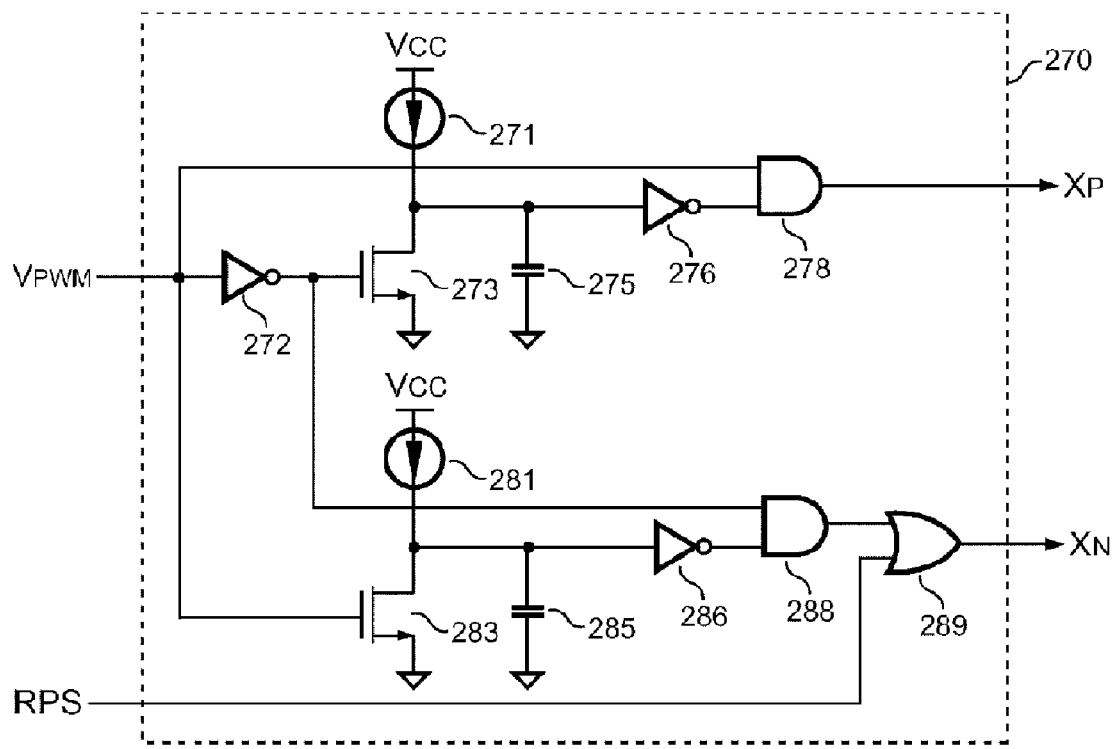
FIG. 4 shows an embodiment of a pulse-signal generator according to the present invention.

FIG. 4 shows an embodiment of the pulse-signal generator 270 according to the present invention. Pulse signals $X_P$ and $X_N$ are differential signals. A positive-polarity pulse signals $X_P$ and $X_N$ is generated in response to the rising edge of the PWM signal $V_{PWM}$. A negative-polarity pulse signals $X_P$ and $X_N$ is generated in response to the falling edge of the PWM signal $V_{PWM}$ and the oscillation signal RPS. Therefore, pulse signals $X_P$ and $X_N$ are one-shot signals. A current source 271 is coupled to charge a capacitor 275. The PWM signal $V_{PWM}$ is coupled to discharge the capacitor 275 via an inverter 272 and a transistor 273 when the PWM signal $V_{PWM}$ is disabled. The capacitor 275 is connected to an input of an inverter 276. Two inputs of an AND gate 278 are coupled to an output of the inverter 276 and the PWM signal $V_{PWM}$. A current source 281 is coupled to charge a capacitor 285. The PWM signal $V_{PWM}$ is coupled to discharge the capacitor 285 via a transistor 283 when the PWM signal $V_{PWM}$ is enabled. The capacitor 285 is connected to the input of an inverter 286. Two inputs of an AND gate 288 are respectively connected to an output of the inverter 286 and the output of the inverter 272. An output of the AND gate 288 and the oscillation signal RPS are coupled to an OR gate 289. An output of the AND gate 278 and an output of the OR gate 289 respectively generate pulse signals $X_P$ and $X_N$. The pulse width of the pulse signals $X_P$ is determined by the current of the current source 271 and the capacitance of the capacitor 275. The pulse width of the pulse signals $X_N$ is determined by the current of the current source 281 and the capacitance of the capacitor 285.

Figure 5:
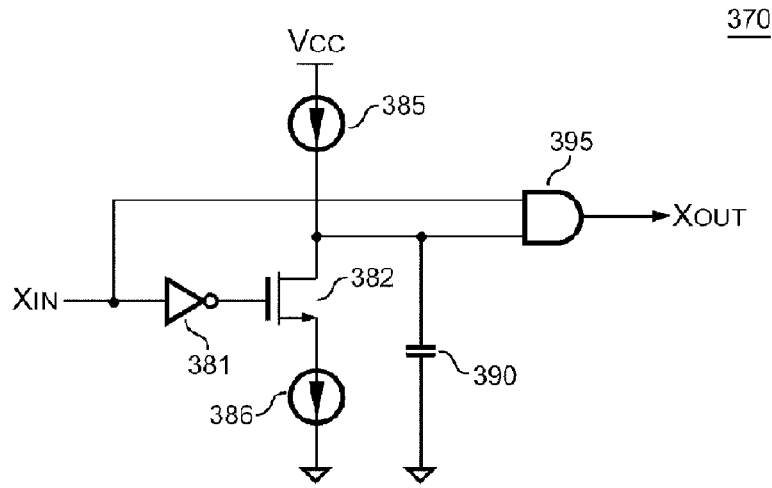
FIG. 5 shows an embodiment of a debounce circuit according to the present invention.

FIG. 5 shows an embodiment of the debounce circuit 370 according to the present invention. A current source 385 is applied to charge a capacitor 390. A current source 386 is utilized to discharge the capacitor 390 via a transistor 382. The input signal $X_{IN}$ is coupled to control the transistor 382 via an inverter 381. Two inputs of an AND gate 395 are coupled to the capacitor 390 and the input signal $X_{IN}$. The output signal $X_{OUT}$ is generated at an output of the AND gate 395. The current of current sources 385, 386 and the capacitance of the capacitor 390 determine the debounce time of the debounce circuit 370.

Figure 6:
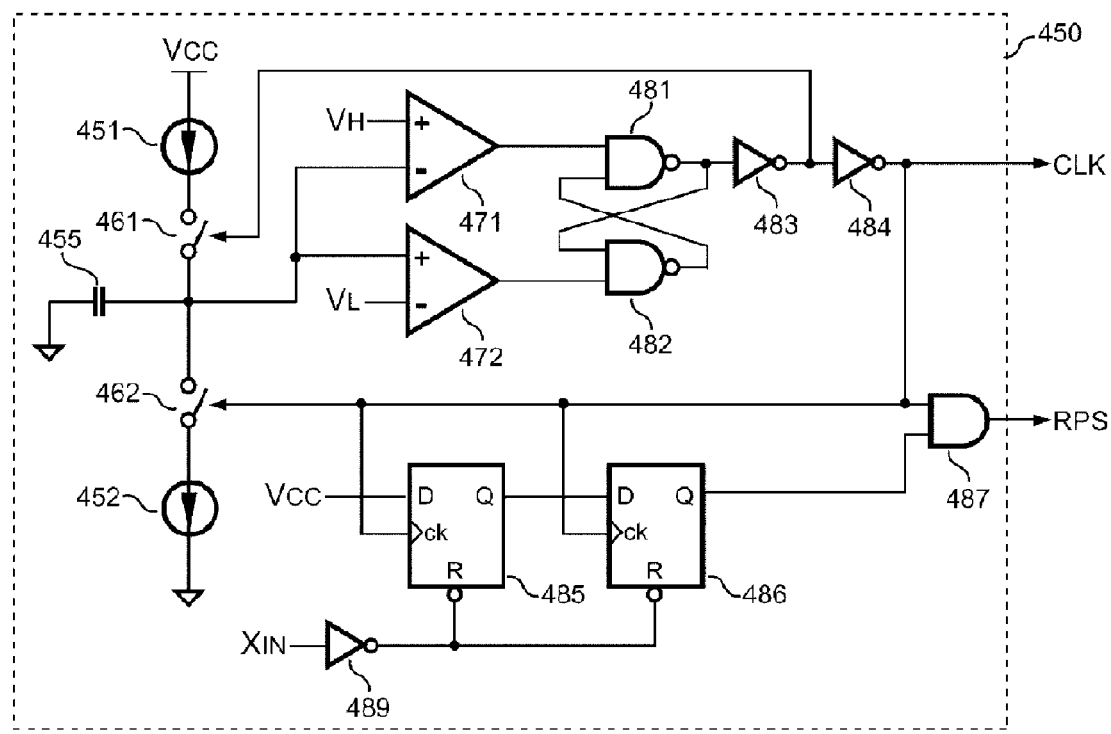
FIG. 6 shows an embodiment of an oscillation circuit according to the present invention.

FIG. 6 shows an embodiment of the oscillation circuit 450 according to the present invention. It generates the oscillation signal RPS and a clock signal CLK. A current source 451 is coupled to charge a capacitor 455 via a switch 461. A current source 452 is coupled to discharge the capacitor 455 via a switch 462. A sawtooth signal is thus generated across the capacitor 455. The capacitor 455 is further connected to comparators 471 and 472. Comparators 471 and 472 have threshold voltages $V_H$ and $V_L$ respectively. NAND gates 481 and 482 develop a SR-latch coupled to the outputs of comparators 471 and 472. An output of the NAND gate 481 generates a charge signal via an inverter 483. The charge signal is coupled to control the switch 461. An output of the inverter 483 is connected to an inverter 484 to generate the clock signal CLK. The clock signal CLK is also coupled to an input of an AND gate 487 and control the switch 462. Another input of the AND gate 487 is connected to an output of a flip-flop 486 for generating the oscillation signal RPS at an output of the AND gate 487. An input of the flip-flop 486 is connected to an output of a flip-flop 485. The clock inputs of flip-flops 485 and 486 are controlled by the clock signal CLK. The reset inputs of flip-flops 485 and 486 are coupled to the input signal $X_{IN}$ via an inverter 489. Therefore, the oscillation signal RPS is generated when the input signal $X_{IN}$ is disabled over two clock-cycles of the clock signal CLK.

FIG. 7 shows an embodiment of the feedback circuit 700 according to the present invention. As aforesaid, the feedback circuit 700 includes an error amplifier, a soft-start circuit and a protection circuit. The error amplifier includes an operational amplifier 710, a level-shift transistor 715 and resistors 720 and 725. The soft-start circuit is developed by a current source 730, a discharge transistor 731, a unit-gain buffer 735, an inverter 732 and a diode 736. Furthermore, a comparator 738 and a timer circuit 800 provide open loop protection.

A reference voltage $V_{REF}$ and the feedback signal $V_{FB}$ are coupled to the operational amplifier 710. The operational amplifier 710 is a trans-conductance amplifier. The operational amplifier 710 has an output terminal COM connected to the capacitor 93, as shown in FIG. 1, for the loop compensation. The output terminal COM is further controlled by the unit-gain buffer 735 via the diode 736. An input of the unit-gain buffer 735 is coupled to the soft-start signal $V_{SS}$. The current source 730 associates with the capacitor 96 of FIG. 1 to generate the soft-start signal $V_{SS}$. The transistor 731 and an inverter 732 are used to discharge the capacitor 96 in response to the power-on signal $S_{PSON}$. Therefore, the soft-start circuit will generate the soft-start signal $V_{SS}$ in response to the power-on signal $S_{PSON}$. The level-shift transistor 715 and resistors 720 and 725 provide level shift and attenuation to the output signal of the operational amplifier 710. The error signal $V_F$ is obtained at the joint of the resistors 720 and 725.

A threshold voltage $V_{TH2}$ is supplied to a negative input of the comparator 738. A positive input of the comparator 738 is coupled to receive the error signal $V_F$. An open-loop signal OPL will be generated at the output of the comparator 738 once the error signal $V_F$ is higher than the threshold voltage $V_{TH2}$. The open-loop signal OPL is enabled when the output of the regulator is over-loaded and/or short-circuited. Once the open-loop signal OPL is enabled for over a time-out period of the timer circuit 800, the off signal OFF will be produced responsively. The off signal OFF is thus generated in accordance with the feedback signal $V_{FB}$ when the feedback of the regulator is under open loop condition.

Figure 8:
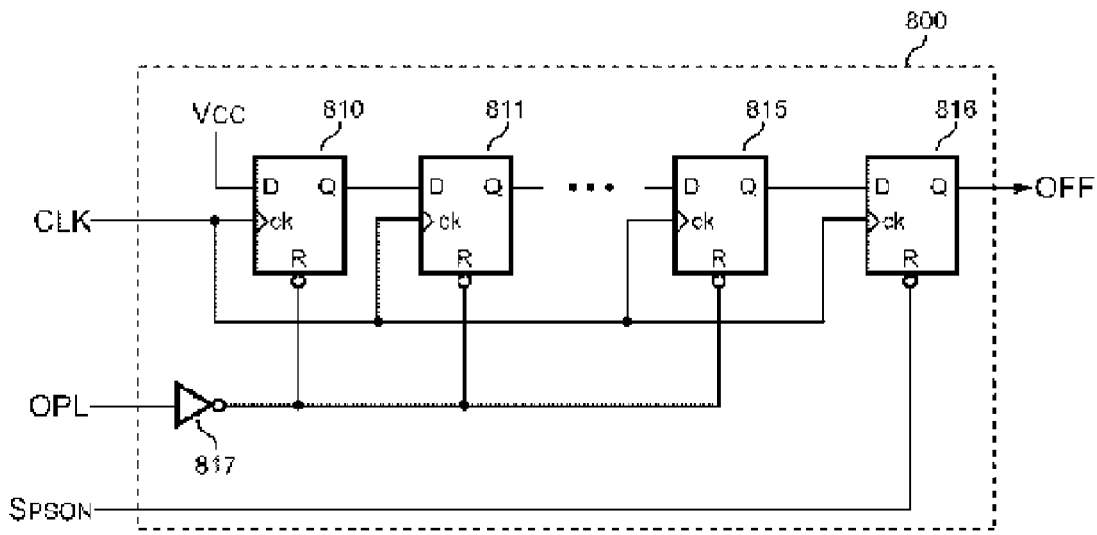
FIG. 8 shows an embodiment of a timer circuit according to the present invention.

FIG. 8 shows an embodiment of the timer circuit 800 according to the present invention. Flip-flips 810, 811 and 815 are connected as a shift counter. A flip-flop 816 operates as a latch-off circuit for generating the off signal OFF. The output of the shift counter is coupled to enable the off signal OFF. The open-loop signal OPL is coupled to reset shift counter via an inverter 817. The power-on signal $S_{PSON}$ is used to reset the off signal OFF.

Figure 9:
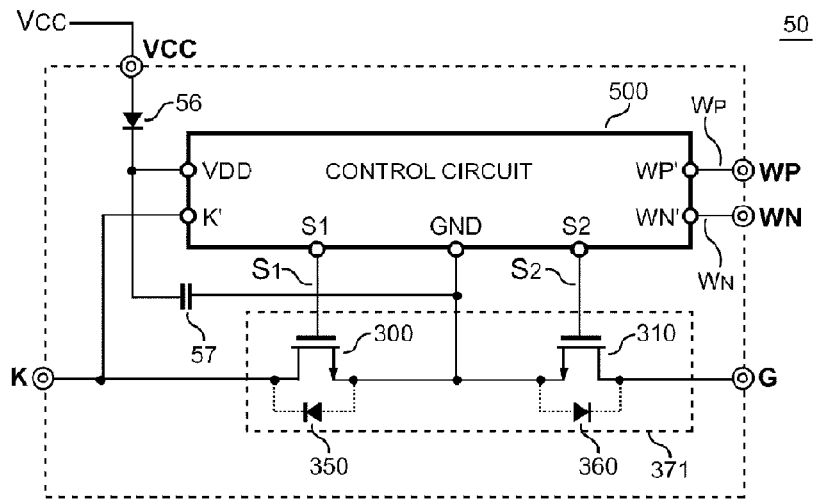
FIG. 9 shows an embodiment of a synchronous switch according to the present invention.

FIG. 9 shows an embodiment of the synchronous switch 50 according to the present invention. The synchronous switch 50 includes a power-switch set 371, a boost diode 56, a boost capacitor 57, and a control circuit 500. The power-switch set 371 includes power switches 300, 310, and diodes 350, 360. The diode 350 is connected to the power switch 300 in parallel. The diode 360 is connected to the power switch 310 in parallel. Power switches 300 and 310 are connected in series and back-to-back. Power switches 300 and 310 are further connected between the terminal K and the terminal G of the synchronous switch 50. The terminal K is coupled to the secondary side of the transformer 10. The terminal G is coupled to the output of the regulator. Terminals WP' and WN' of the control circuit 500 respectively receive pulse signals $S_P$ and $S_N$ for generating gate-driving signals $S_1$ and $S_2$. Gate-driving signals $S_1$ and $S_2$ are couple to turn on or off the power switch 300 and 310 respectively. The boost diode 56 and the boost capacitor 57 form a charge-pump circuit to power the control circuit 500. A power source $V_{CC}$ is connected to charge the boost capacitor 57 via the boost diode 56. A terminal $V_{DD}$ and a terminal GND of the control circuit 500 are connected to the boost capacitor 57 in parallel. The terminal GND is further connected to the sources of power switches 300 and 310.

Figure 10:
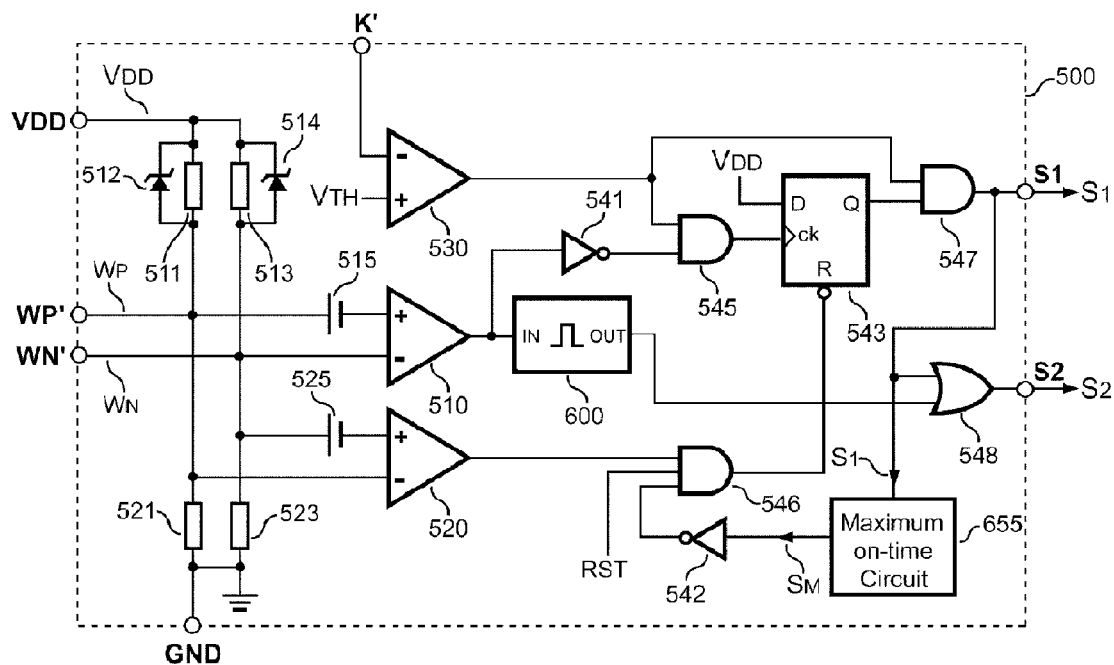
FIG. 10 shows an embodiment of a control circuit of the synchronous switch according to the present invention.

FIG. 10 shows an embodiment of the control circuit 500 according to the present invention. Resistors 511, 521, 513 and 523 provide bias termination for receiving pulse signals $S_P$ and $S_N$. Zener diodes 512 and 514 are used for protection. Pulse signals $S_P$ and $S_N$ are coupled to comparators 510 and 520. Comparators 510 and 520 have offset voltages 515 and 525 respectively, which provides hysteresis for the comparison. A comparator 530 has a threshold voltage $V_{TH}$ supplied to its positive input. A negative input of the comparator 530 is coupled to the terminal K' of the control circuit 500, which is further connected to the terminal K of the synchronous switch 50. An output of the comparator 510 is coupled to enable a D-flip-flop 543 via an inverter 541 and an AND gate 545. The D-flip-flop 543 operates as a latch circuit. An input of the AND gate 545 is connected to the output of the comparator 530. A reset-input of the D-flip-flop 543 is controlled by an output of the comparator 520 via an AND gate 546. An output of the D-flip-flop 543 and the output of the comparator 530 are connected to two inputs of an AND gate 547. The gate-driving signal $S_1$ is generated at the output of the AND gate 547 for turning on or off the power switch 300. The maximum on-time of the gate-driving signal $S_1$ is limited by a maximum-on-time circuit 655. The gate-driving signal $S_1$ is coupled to the maximum-on-time circuit 655. After a blanking time, a maximum-on-time signal $S_M$ will be produced when the gate-driving signal $S_1$ is enabled. The maximum-on-time signal $S_M$ is supplied to the AND gate 546 via an inverter 542. Another input of the AND gate 546 is supplied with a power-on reset signal RST. An output of the AND gate 546 is couple to reset the D-flip-flop 543. The maximum on-time of the gate-driving signal $S_1$ is thus limited by the blanking time of the maximum-on-time circuit 655. The gate-driving signal $S_1$ will turn off the power switch 300 once following equation (1) is satisfied.

$$V_{SP} - V_{SN} > V_{525} \qquad (1)$$

The gate-driving signal $S_1$ will turn on the power switch 300 when equations (2) and (3) are satisfied, $$V_{SN} - V_{SP} > V_{515} \qquad (2)$$

$$V_K < V_T \qquad (3)$$

where $V_{SP}$ and $V_{SN}$ respectively represent the voltage of pulse signals $S_P$ and $S_N$; $V_K$ represents the voltage at the terminal K; $V_T$ represents the value of the threshold voltage $V_{TH}$; $V_{515}$ is the value of the offset voltage 515; $V_{525}$ is the value of the offset voltage 525.

The voltage $V_K$ will be lower than the voltage $V_T$ once the diode 350 is conducted. The power switch 300 can only be turned on after the diode 350 is turned on, which synchronizes the switching and the polarity of the transformer 10, and achieves soft-switching operation of the power switch 300. Another gate-driving signal $S_2$ is generated at the output of an OR gate 548 for switching on or off the power switch 310. An input of the OR gate 548 is coupled to the gate-driving signal $S_1$. Another input of the OR gate 548 is controlled by a one-shot-signal generator 600. An input of the one-shot-signal generator 600 is connected to the output of the comparator 510. Therefore, the gate-driving signal $S_2$ is generated in response to pulse signals $S_P$ and $S_N$. After that, the on/off states of the gate-driving signal $S_2$ is corresponding to the gate-driving signal $S_1$.

Figure 11:
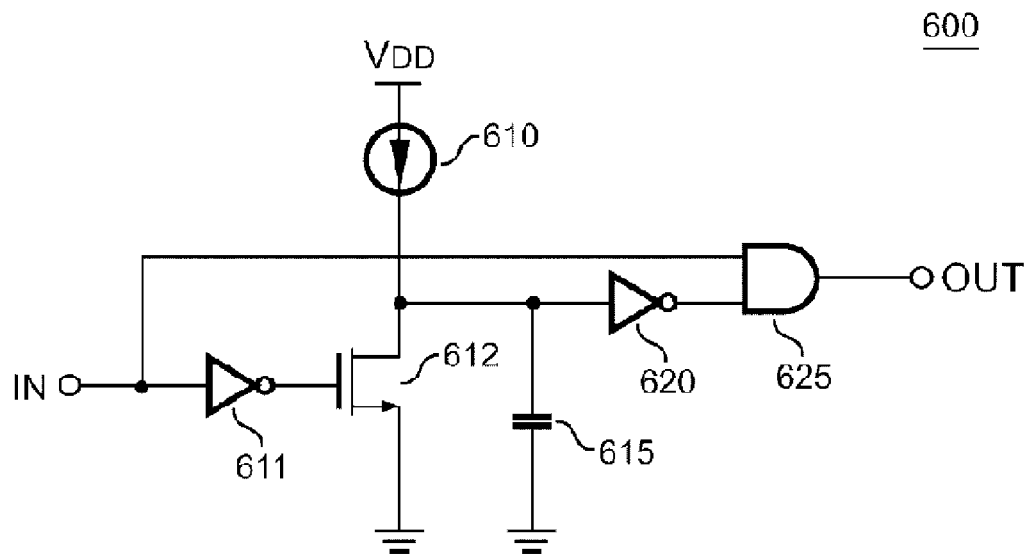
FIG. 11 shows an embodiment of a one-shot-signal generator according to the present invention.

FIG. 11 shows an embodiment of the one-shot-signal generator 600. A current source 610 is connected to charge a capacitor 615. A transistor 612 is coupled to discharge the capacitor 615. An input signal at an input terminal IN is coupled to control the transistor 612 via an inverter 611. The input terminal IN is further connected to an input of an AND gate 625. Another input of the AND gate 625 is coupled to the capacitor 615 via an inverter 620. An output terminal OUT of the one-shot-signal generator 600 is connected to an output of the AND gate 625 to generate an output signal. When the input signal is logic-low, the capacitor 615 is discharged and the output signal becomes logic-low. When the input signal changes to logic-high, the current source 610 will start to charge the capacitor 615. The output signal at the AND gate 625 is a one-shot signal. The current of the current source 610 and the capacitance of the capacitor 615 determine the pulse width of the one-shot signal.

Figure 12:
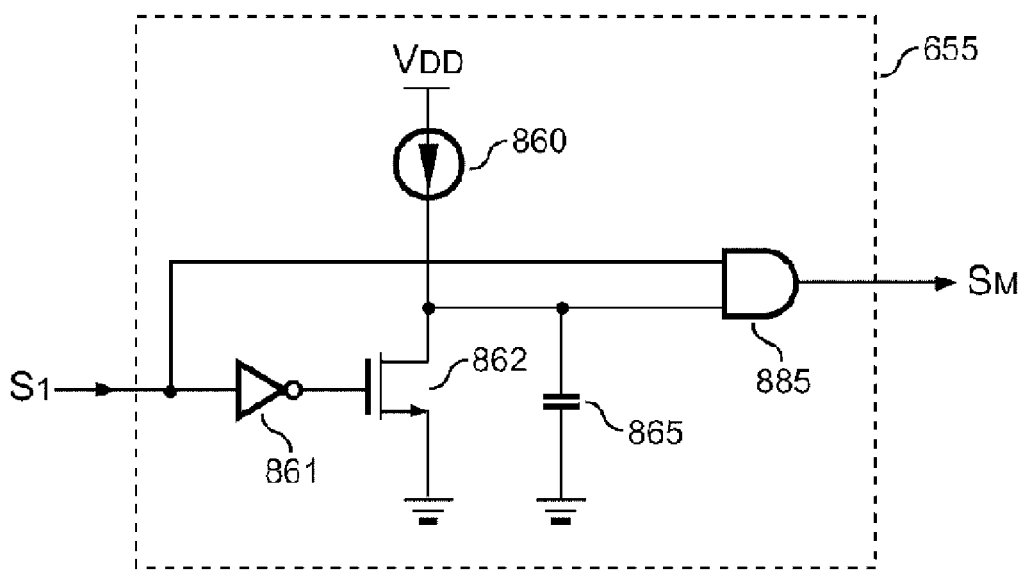
FIG. 12 shows an embodiment of a maximum-on-time (MOT) circuit according to the present invention.

FIG. 12 shows an embodiment of the maximum-on-time (MOT) circuit 655 according to the present invention. A current source 860 is coupled to charge a capacitor 865. A transistor 862 is coupled to discharge the capacitor 865. The gate-driving signal $S_1$ is coupled to control the transistor 862 via an inverter 861. The gate-driving signal $S_1$ is further supplied to an input of an AND gate 885. Another input of the AND gate 885 is coupled to the capacitor 865. Once the gate-driving signal $S_1$ is enabled, the output of the AND gate 885 will generate the maximum-on-time signal $S_M$ to disable the gate-driving signal $S_1$ after a blanking time. The blanking time is determined by the current of the current source 860 and the capacitance of the capacitor 865.

Figure 13:
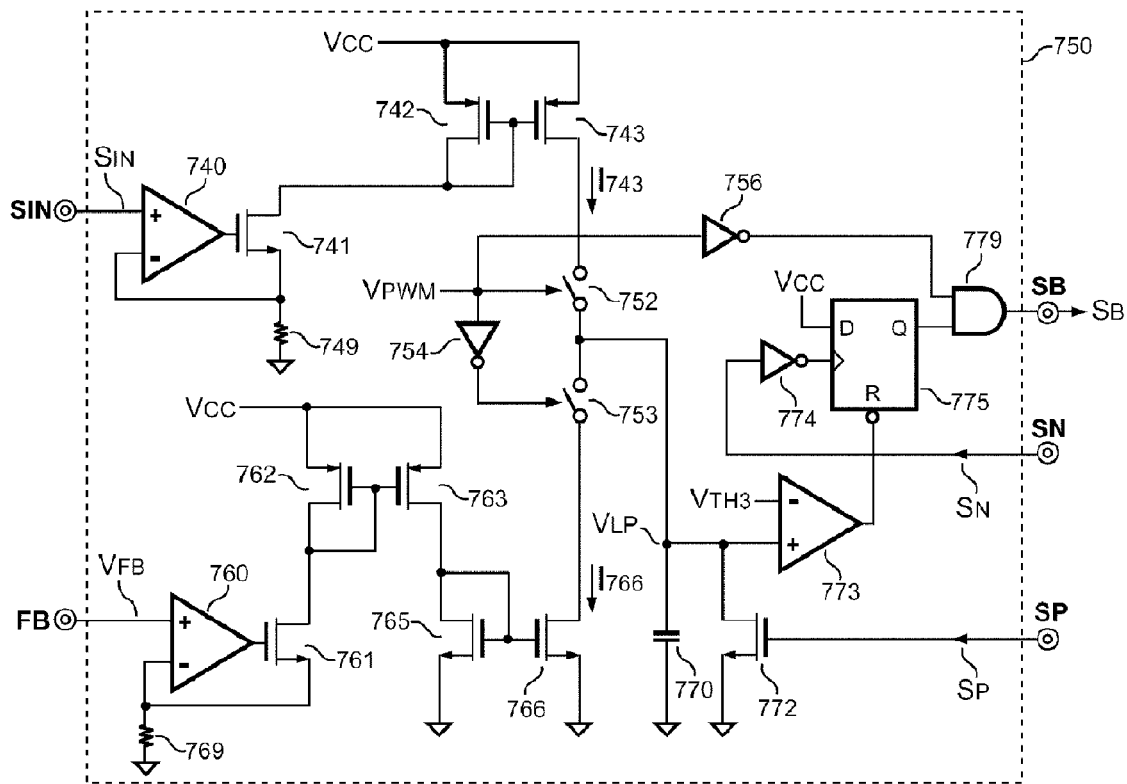
FIG. 13 shows an embodiment of a linear-predict circuit according to the present invention.

FIG. 13 shows an embodiment of the linear-predict circuit 750. The linear-predict circuit 750 is developed to turn off the flyback switch 70 of FIG. 1 when the regulator operates under discontinuous current mode. Turning off the flyback switch 70 prevents a reverse current flowing from the output capacitor 85 of FIG. 1 to the flyback switch 70 under discontinuous current mode. A charge current $I_{743}$ is coupled to charge a capacitor 770 via a switch 752. A discharge current $I_{766}$ is coupled to discharge the capacitor 770 via a switch 753. The PWM signal $V_{PWM}$ is coupled to control the switch 752. The PWM signal $V_{PWM}$ is further coupled to control the switch 753 via an inverter 754.

An operational amplifier 740, a resistor 749 and transistors 741, 742 and 743 develop a voltage-to-current converter. The operational amplifier 740 is coupled to receive the switching signal $S_{IN}$ for generating the charge current $I_{743}$ via the transistor 743. An operational amplifier 760, a resistor 769 and transistors 761, 762, 763, 765 and 766 develop another voltage-to-current converter. The operational amplifier 760 is coupled to receive the feedback signal $V_{FB}$ for generating the discharge current $I_{766}$ via the transistor 766.

The capacitor 770 is charged once the PWM signal $V_{PWM}$ is enabled, and discharged once the PWM signal $V_{PWM}$ is disabled. In addition, the pulse signal $S_P$ is coupled to discharge the capacitor 770 via a transistor 772. A linear-predict signal $V_{LP}$ is thus obtained across the capacitor 770. The pulse signal $S_N$ is coupled to enable a D-flip-flop 775 via an inverter 774. The PWM signal $V_{PWM}$ is supplied to an input of an AND gate 779. Another input of the AND gate 779 is coupled to an output of the D-flip-flop 775. An output of the AND gate 779 generates the driving signal $S_B$ once the PWM signal $V_{PWM}$ is disabled. A reset-input of the D-flip-flop 775 is connected to an output of a comparator 773. A threshold voltage $V_{TH3}$ is connected to a negative input of the comparator 773. A positive input of the comparator 773 is connected to the capacitor 770 to receive the linear-predict signal $V_{LP}$. When the linear-predict signal $V_{LP}$ is lower than the threshold voltage $V_{TH3}$, the comparator 773 will reset the D-flip-flop 775 to disable the driving signal $S_B$. The driving signal $S_B$ is therefore generated in response to the switching signal $S_{IN}$, the feedback signal $V_{FB}$ and the pulse width of the PWM signal $V_{PWM}$.

When the regulator operates under boundary mode, a magnetized flux $\Phi_C$ of the inductor 80 of FIG. 1 is equal to its demagnetized flux $\Phi_D$. The boundary mode means the regulator is operated between continuous current mode and discontinuous current mode.

The equations are shown below, $$\Phi_C \Phi_D \quad (4)$$

$$\Phi = B \times Ae = \frac{V \times T}{N} \quad (5)$$

$$\left[\left(\frac{V_{IN} \times N_S}{N_P}\right) - V_O\right] \times T_{CHARGE} = V_O \times T_{DISCHARGE} \quad (6)$$

$$T_{DISCHARGE} = \left\{\left[\left(\frac{V_{IN} \times N_S}{N_P}\right) - V_O\right] \middle/ V_O\right\} \times T_{CHARGE} \quad (7)$$

where B is the flux density; Ae is the cross-section area of the inductor 80; $N_S/N_P$ is the turn ratio of the transformer 10; the magnetized time (denoted as $T_{CHARGE}$) is equivalent to the pulse width of the PWM signal $V_{PWM}$; the demagnetized time (denoted as $T_{DISCHARGE}$) of the inductor 80 shows the boundary condition of the regulator.

The demagnetized time $T_{DISCHARGE}$ of the inductor 80 can be obtained in accordance with the equation (7). It also shows the demagnetized time $T_{DISCHARGE}$ can be predicted in accordance with the input voltage $V_{IN}$, the output voltage $V_O$ and the magnetized time $T_{CHARGE}$ (the pulse width of the PWM signal $V_{PWM}$). The switching signal $S_{IN}$ is correlated to the input voltage $V_{IN}$. The feedback signal $V_{FB}$ is correlated to the output voltage $V_O$.

Figure 14:
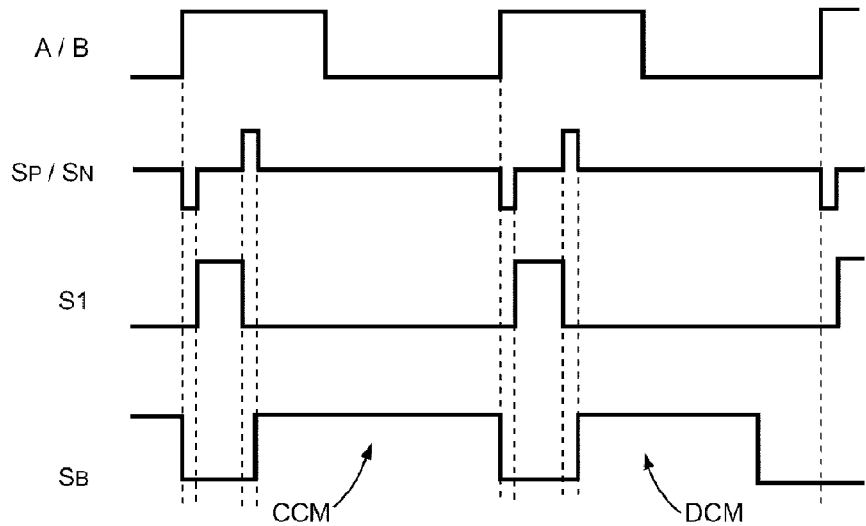
FIG. 14 shows signal waveforms according to the present invention.

FIG. 14 shows waveforms of primary switching signals A, B, pulse signals $S_P$ and $S_N$, the gate-driving signal $S_1$ and the driving signal $S_B$. The driving signal $S_B$ is disabled before the regulator operates under discontinuous current mode (the inductor 80 is fully demagnetized).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An offline synchronous regulator, comprising:
a plurality of switches, coupled to switch a primary winding of a transformer and generating a switching signal in a secondary winding of said transformer;
a switching circuit, coupled to said transformer and an output of said offline synchronous regulator to generate pulse signals in response to said switching signal and a feedback signal; and
a synchronous switch, having a power-switch set and a control circuit, said power-switch set being coupled from said transformer to said output of said offline synchronous regulator; said control circuit being operated to receive said pulse signals for turning on or off said power-switch set;
wherein said feedback signal is correlated to said output of said offline synchronous regulator; said pulse signals are generated for rectifying and regulating said offline synchronous regulator; and a polarity of said pulse signals determines on or off states of said power-switch set.

2. The offline synchronous regulator as claimed in claim 1, wherein said power-switch set is formed by a first switch and a second switch connected in series; said first switch has a first diode connected in parallel, said second switch has a second diode connected in parallel; said control circuit generates a first control signal and a second control signal; said first control signal is coupled to control said first switch, said second control signal is coupled to control said second switch.

3. The offline synchronous regulator as claimed in claim 2, wherein said first switch can be turned on once said first diode is conducted.

4. The offline synchronous regulator as claimed in claim 1, wherein said synchronous switch comprises:
a boost diode and a boost capacitor, for developing a charge-pump circuit to power said control circuit;
wherein a power source is coupled to charge said boost capacitor via said boost diode; said control circuit is connected in parallel to said boost capacitor; said boost capacitor is connected to said power-switch set.

5. The offline synchronous regulator as claimed in claim 1, further comprising:
a flyback switch, coupled to said power-switch set to freewheel an inductor current of said offline synchronous regulator;
wherein said flyback switch is turned on in response to an off state of said power-switch set; an on-time of said flyback switch is correlated to an on-time of said power-switch set.

6. The offline synchronous regulator as claimed in claim 1, wherein said switching circuit comprises:
a linear-predict circuit, for generating a driving signal in response to said switching signal and said pulse signals;
wherein said driving signal is utilized to control said flyback switch.

7. The offline synchronous regulator as claimed in claim 1, wherein said switching circuit comprises:
a PWM circuit, for generating a PWM signal in response to said switching signal;
an error amplifier, coupled to said output of said offline synchronous regulator to receive said feedback signal and generate an error signal;
a soft-start circuit, for generating a soft-start signal in response to a power-on signal;
a ramp circuit, for generating a ramp signal in response to said PWM signal;
a comparator, for generating a clear signal to disable said PWM signal in response to said error signal and said ramp signal; and
a pulse-signal generator, for generating said pulse signals in accordance with said PWM signal;
wherein said PWM signal is enabled in response to said switching signal, said PWM signal is disabled in response to said clear signal; said soft-start signal is coupled to control the pulse width of said PWM signal; said pulse signals are differential signals, and the polarity of said pulse signals determine the on/off states of said power-switch set.

8. The offline synchronous regulator as claimed in claim 7, wherein said switching circuit further comprises:
an oscillation circuit, for generating an oscillation signal;
wherein said oscillation signal is coupled to said pulse-signal generator to generate said pulse signals for turning off said power-switch set.

9. The offline synchronous regulator as claimed in claim 7, wherein the switching circuit further comprises:
a comparison circuit, for generating an open-loop signal in response to said feedback signal; and
a timer circuit, for generating an off signal in response to said open-loop signal;
wherein said open-loop signal is enabled when said feedback signal is higher than an open-loop threshold; said off signal is generated when said open-loop signal is enabled for over a time-out period of said timer circuit; and said off signal is coupled to disable said PWM signal.

10. The offline synchronous regulator as claimed in claim 1, wherein the synchronous switch comprises:
an input terminal, coupled to said transformer;
an output terminal, coupled to said output of said offline synchronous regulator;
a first input terminal; and
a second input terminal;
wherein said power-switch set is connected in between said input terminal and said output terminal; said first input terminal and said second input terminal are coupled to said control circuit to receive pulse signals for turning on/off said power-switch set.

11. The offline synchronous regulator as claimed in claim 1, wherein said control circuit comprises a latch circuit coupled to receive said pulse signals for set or reset said latch circuit; and said latch circuit is coupled to turn on/off said power-switch set.

12. A method for providing a synchronous switching regulator, comprising:
switching a transformer to generate a switching signal at a secondary winding of said transformer;
generating pulse signals in response to a feedback signal and said switching signal;
transferring said pulse signals to a latch;
setting or resetting said latch in response to the polarity of said pulse signals; and
turning on/off a power-switch set in accordance with a state of said latch;
wherein said feedback signal is correlated to an output of said synchronous switching regulator; and said power-switch set is coupled in between said transformer and said output of said synchronous switching regulator for rectifying and regulating thereof.

13. The method as claimed in claim 12, further comprising:
generating a driving signal to turn on/off a flyback switch in response to said switching signal and said pulse signals;

wherein said flyback switch is coupled to said power-switch set and said output of said synchronous switching regulator.

14. The method as claimed in claim 12, further comprising:
generating an off signal to turn off said power-switch set in response to an open-loop signal; and
generating said open-loop signal in response to said feedback signal;
wherein said open-loop signal is generated when said feedback signal is higher than an open-loop threshold; and said off signal is generated when said open-loop signal sustains over a time-out period.

15. The method as claimed in claim 12, wherein a maximum on-time of said power-switch set is limited by a maximum-on-time circuit.

* * * * *